Nov. 6, 1951  J. P. ENSLOW ET AL  2,574,025
ANGULARLY ADJUSTABLE CIRCULAR SAW MOUNTING
Filed May 27, 1947

INVENTORS.
JOHN P. ENSLOW
PAUL L. WAGNER
BY
Bruce & Brosler
THEIR ATTORNEYS

Patented Nov. 6, 1951

2,574,025

UNITED STATES PATENT OFFICE 2,574,025

ANGULARLY ADJUSTABLE CIRCULAR SAW MOUNTING

John P. Enslow, San Francisco, and Paul L. Wagner, Walnut Creek, Calif.; said Enslow assignor to John R. Rule, Berkeley, Calif.

Application May 27, 1947, Serial No. 750,652

2 Claims. (Cl. 144—238)

Our invention relates to circular saw mountings and more particularly to means for adjusting the angularity of such a saw on its spindle to cut grooves within a range of widths.

Among the objects of our invention are:

(1) To provide a circular saw mounting which includes novel and improved means for adjusting the angularity of such saw on its spindle;

(2) To provide a circular saw mounting which includes novel and improved saw angle adjustment means of utmost simplicity and involving a minimum of easily manufactured components;

(3) To provide a novel and improved circular saw mounting which permits angular adjustment of the saw in a very simple manner.

Additional objects of our invention will be brought out in the following description of the same taken in conjunction with the accompanying drawings wherein—

Figure 1:
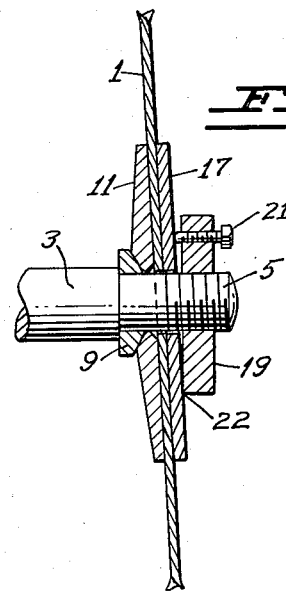
Figure 1 is a view in section of one embodiment of our invention as assembled for use.
Figure 2:
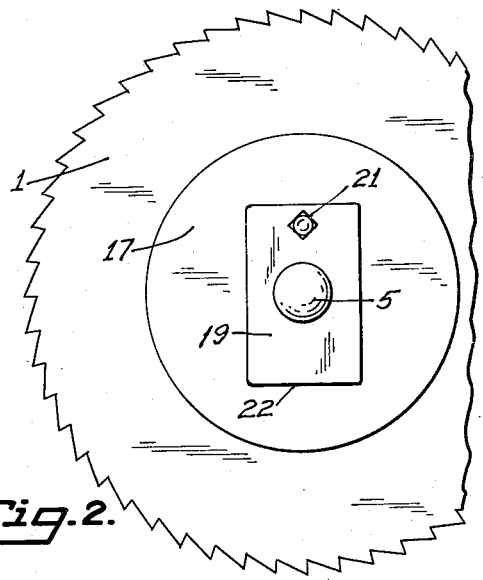
Figure 2 is a side view of the assembly of Figure 1.

Referring to the drawings for a detailed description of our invention, the same has been illustrated as assembled for use with a circular saw 1, the assembly being mounted on a conventional spindle which comprises a shaft 3 having a reduced end portion 5, the end of which in turn is normally threaded for the reception of a holding nut. The reduced end portion creates a shoulder against which lies a washer 9 having a convex side which provides a complementary fit with an adjacently disposed washer 11 of larger diameter and having a concave recess into which the convex side of the first washer fits. This washer of larger diameter has an exposed planar surface against which such circular saw might be disposed.

Another washer 17 of a diameter corresponding to the latter mentioned washer and preferably formed with planar side walls, is disposed on the spindle adjacent the opposite side of the saw.

A plate 19 in the form of a rectangular nut is threaded onto the spindle. At a point radially spaced from the axis of the nut and symmetrically located thereon is a threaded opening therethrough for the reception of a set screw 21, the inner end of which is adapted to engage and bear against the adjacent washer 17.

The described location of the set screw leaves one edge 22 of the nut lying normal to a line through the centers of the set screw opening and the spindle opening, such edge therefore being adapted to provide contact with the adjacent washer 17 at a plurality of points forming a line contact.

In effecting a desired angular adjustment of the saw, the nut is adjusted to a position on the spindle which will permit of the desired angularity of the saw, following which the set screw will be turned down to lock the assembly in such adjusted position.

In the embodiment of Figure 1, as described, the washer 17 against which the set screw acts, may be eliminated without destroying the operativeness of the assembly, though in this particular embodiment, such washer is preferably retained as it offers increased support to the saw.

Figure 3:
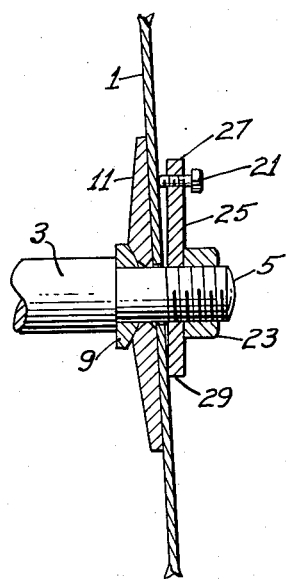
Figure 3 is a view in section corresponding to that of Figure 1, depicting a second embodiment of our invention.
Figure 4:
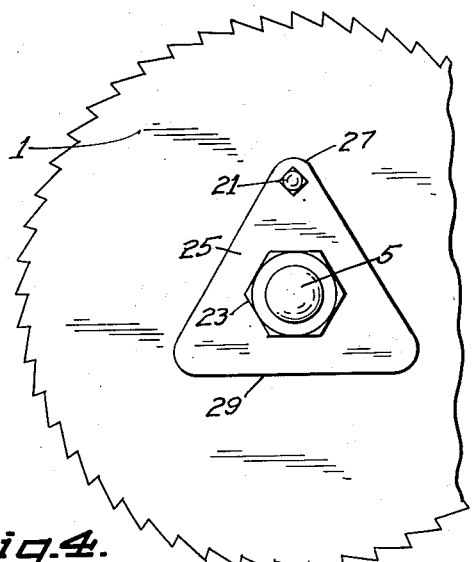
Figure 4 is a side view of the assembly of Figure 3.

In the embodiment of Figure 3 which has been designed for lighter duty service, such washer is preferably eliminated, and the nut of Figure 1 is preferably replaced by its equivalent in the form of a combination of a conventional nut 23 and an adjacently disposed plate 25 of substantial area. While such plate may be of rectangular shape, somewhat on the order of the nut of Figure 1, we prefer to make it of triangular form with the set screw opening at the apex 27, thus leaving the base 29 to provide a line contact engagement against the saw.

The saw adjustments are made in a manner similar to that described in connection with the embodiment of Figure 1, by first adjusting the position of the nut 23 to permit of the proper angular swing of the saw and then locking the saw in such angular adjusted position by means of the set screw 21.

From the above description of our invention, it will be apparent that the same fulfills the objects previously recited and while we have described the two embodiments of our invention in considerable detail, the same is subject to minor modifications and alterations without departing from the underlying principles of the invention and we, accordingly, do not desire to be limited in our protection to the specific details illustrated and described, except as may be required by the appended claims.

We claim:

1. An assembly for adjusting the angularity of a circular saw on its spindle, comprising a pair of washers having a complementary fit with each other on a spherical surface, one of said washers having an exposed surface against which a circular saw might be disposed when mounted on a spindle while the other of said washers has a planar surface to engage an abutment on said spindle; and a plate having a threaded opening therethrough for engaging a threaded portion of said spindle and an adjusting screw opening therethrough radially spaced from said spindle opening for the reception of an adjusting screw and on the other side of said spindle opening an edge normal to a line through the centers of said adjusting screw opening and said spindle opening, a set screw in said adjusting screw opening, and means for engagement with a threaded portion of such spindle to preclude shifting of said plate away from said saw when said set screw is tightened.

2. An assembly for adjusting the angularity of a circular saw on its spindle, comprising a pair of washers, one having a planar surface to engage an abutment on said spindle and a convex wall, and the other a concave recess complementary thereto and an exposed planar surface against which a circular saw might be disposed when mounted on a spindle, another washer for contact with the other side of such saw, a nut having a threaded opening therethrough for engagement with a threaded portion of said spindle and a threaded opening therethrough radially spaced from said spindle opening for the reception of a set screw and an edge normal to a line through the centers of said set screw opening and said spindle opening, and a set screw in said set screw opening.

JOHN P. ENSLOW.
PAUL L. WAGNER.

REFERENCES CITED

The following references are of record in the file of this patent:

UNITED STATES PATENTS

| Number | Name | Date |
| --- | --- | --- |
| 13,357 | Keeney | July 31, 1855 |
| 13,932 | Highfield | Dec. 11, 1855 |
| 17,823 | Harrison | July 14, 1857 |
| 161,287 | Slayton | Mar. 23, 1875 |
| 422,788 | Hurd | Mar. 4, 1890 |